United States Patent [19]

Yves et al.

[11] Patent Number: 4,624,179
[45] Date of Patent: Nov. 25, 1986

[54] AUTOMATIC CONTROL DEVICE FOR TYING IN A HAY BALER

[75] Inventors: Drutel Yves, Meudon la Foret; Joyez Gérard, Grisy Suisnes, both of France

[73] Assignee: Regie Nationale des Usines Renault, Boulogne-Billancourt, France

[21] Appl. No.: 582,740

[22] Filed: Feb. 23, 1984

[30] Foreign Application Priority Data

Feb. 28, 1983 [FR] France .................. 83 03276

[51] Int. Cl.$^4$ ............................................. B65B 13/18
[52] U.S. Cl. ............................................. 100/4; 100/5; 100/13; 100/99; 364/400
[58] Field of Search ............... 100/4, 5, 13, 88, 99; 82/14 R, 14 A, 14 B, 14 C; 364/194, 400; 83/71; 72/7

[56] References Cited

U.S. PATENT DOCUMENTS

| | | | |
|---|---|---|---|
| 3,674,063 | 7/1972 | Klingbeil | 82/14 C X |
| 3,913,473 | 10/1975 | Meiers | |
| 4,022,120 | 5/1977 | McAllister | 100/5 |
| 4,277,833 | 7/1981 | Steffen | |
| 4,328,050 | 5/1982 | Ashizawa | 82/14 B X |
| 4,354,429 | 10/1982 | Boldenow | 100/5 |
| 4,386,561 | 6/1983 | Viaud | 100/5 |

FOREIGN PATENT DOCUMENTS

| | | |
|---|---|---|
| 0046427 | 2/1982 | European Pat. Off. . |
| 0060366 | 9/1982 | European Pat. Off. . |
| 2393359 | 12/1978 | France . |
| 2397144 | 2/1979 | France . |
| 2424579 | 4/1979 | France . |

OTHER PUBLICATIONS

Le Nouvel Automatisme, vol. 26, No. 26, Nov./Dec. 1981 (Paris) M. Feretti, "Panorama de 150 Manipulateurs et Robots industriels".

Le Nouvel Automatisme, Mar. 1982, (Paris), P. Baylou et al., "La Robotique Agricole".

Primary Examiner—Billy J. Wilhite
Attorney, Agent, or Firm—Oblon, Fisher, Spivak, McClelland & Maier

[57] ABSTRACT

An automatic control device for tying large diameter cylindrical bales produced by a hay baler. A tie guiding arm has an end which can be driven back and forth over the entire width of the bale by an electric motor. A microprocessor receives inputs indicating the driving speed of the baler, the diameter of the bale and the desired number of turns of the tie. The motor driving the guiding arm is discontinuously driven by the microprocessor so that the arm is held in a stationary position for a predetermined length of time at a predetermined number of stops. The microprocessor may also operate in a learning mode where the operator sets the number of stops and the length of time.

9 Claims, 8 Drawing Figures

AUTOMATIC CONTROL DEVICE FOR TYING IN A HAY BALER

BACKGROUND OF THE INVENTION

1. Field of the Invention

This invention relates to the automation of certain particular stages of the operation of a hay baler and more particularly to an automatic tying control device for a hay baler able to form large-diameter cylindrical bales.

2. Description of the Prior Art

Balers of the present type which are intended to be hitched to a tractor and connected to the power take-off of the tractor to provide the movement of the various elements of the baler including a bale-forming chamber. The hay is fed inside the chamber from a collector that takes up the row from the ground. The row thus introduced into the chamber for forming the cylindrical bale, is gradually rolled up on itself, the bale being formed being subjected to a rotating movement around its axis by inward tightening of a loop formed in a multiplicity of belts passing over several tension rollers some of which have shafts which can be moved as the diameter of the bale being formed increases. Springs act on some of these tension rollers so as to exert, on the belts which surround the bale, a sufficient pressure to make bales of suitable density.

When the bale of hay has reached the desired diameter, it is tied by means of a tie consisting generally of twine which can be introduced by a guiding device in front of the intake opening in the hay baler. The free end of the tie is then grasped by the hay fold and the tie is wound around the bale under the action of the rotation of this bale between the belts which hold it. The baler contains on its back wall a door whose opening makes possible the ejection of the bale after the typing operation. To distribute appropriately the windings of the tie along the axial length of the cylindrical bale, the device for guiding the tie is made to be moved in a back and forth movement along the entire width of the baler.

The movement of this guiding device can be done manually by the operator by pulling on a cable and returning it to the position of the guiding device under the action of a return spring.

There have also been described devices that make it possible to provide the back and forth movement in a semiautomatic manner, for example, in European patent application No. 0046 427 and in French patent application 2,397,144.

Until now, the various operations which follow the formation of the bale inside the baler have not been the object of complete automation and therefore, each time a certain number of manual interventions have been by the operator. Consequently, there are, in particular, irregularities in the tying of the resulting bales and a notable increase in the operating waiting times after the formation of each bale to allow the operation of tying and ejecting the tied bale.

SUMMARY OF THE INVENTION

Accordingly, one object of this invention is to provide a novel automated control device for tying and ejecting hay bales.

Another object of this invention is to provide a hay baler with great regularity in the tying of bales.

A further object of this invention is to provide a hay baler which automatically controls the tying and ejecting steps so that the resulting bales are tied according to the desires of the user.

A still further object of this invention is to provide a hay baler having tying and ejecting steps which are quickly performed.

The automatic control device for tying large-diameter cylindrical bales according to the present invention is located on a hay baler which includes an arm for guiding the tie whose end can be given a back and forth movement over the entire width of the baler under the action of an electric motor. The baler comprises, in addition, means for driving the bale in rotation and a first sensor detecting the drive speed of these means, thereby making it possible to deduce from it the rotation speed of the bale which depends both on the linear speed of the means for driving the bale and on the diameter of this bale. According to the invention, the automatic tying control device comprises a microprocessor that receives the input signals sent by said first sensor and able to send control signals to drive in a discontinuous manner the electric motor that controls the back and forth movement of the arm for guiding the tie. The microprocessor stores data and is able to be programmed so that the back and forth movement of the arm for guiding the tie comprises a determined number of stops during which the arm is held in a stationary position while the bale continues its rotation. The number of stops and the duration of these stops are computed by the microprocessor as a function of the diameter of the bale and of the number of tying turns desired by the operator.

A second sensor is provided on the baler so as to detect a predetermined diameter of the bale being formed, the signal coming from this second sensor also being introduced into the microprocessor.

Moreover, the operator has a control console on which he can display the number of tying turns that he desires to see made on the bale. This information, introduced into the microprocessor, then makes it possible for the microprocessor to perform the computation which has just been indicated and to control, as a function of the result of this computation, the discontinuous movement of the arm for guiding the tie.

In another embodiment of the invention, the microprocessor of the automatic control device is able, during a first phase or learning mode, to store the periods of movement of the drive motor of the arm for guiding the tie in one direction or the other and the periods of rest as they are controlled manually by the operator from his console. The microprocessor is also able, during a second phase, each time to control the back and forth movement of the arm for guiding the tie by actuating its control motor according to an operating cycle that reproduces the cycle stored during the first phase or learning mode.

The baler preferably further comprises means for detecting the tension of the tie at the beginning of the tying operation. The data coming from a third sensor detecting this tension is also introduced into the microprocessor to monitor the appropriate progress of the tying operation.

The hay baler equipped with the automatic control device of the invention further comprises a door that can be opened and closed by a double action jack and locked in the closed position, the opening of the door causing the ejection of the tied bale. A fourth sensor associated with the device for cutting the tie at the end of the tying operation sends a signal which is received by the microprocessor which can then cause the ejection of the bale by opening the door of the baler when the signal sent by said first sensor corresponds to the stopping of the rotation of the bale. The microprocessor then automatically controls the closing of the door.

The hay baler preferably comprises a ramp for unloading the ejected bales. The automatic control device further comprises a fifth sensor connected to the unloading ramp to detect the ejection of the bale, the signal coming from this sensor being sent to the microprocessor to control the ejection phase of the bale.

A sixth sense is further preferably provided to detect the displacement speed of the baler, the microprocessor receiving the signal coming from this sensor to allow the tying and ejection operations only upon the complete stopping of the baler.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
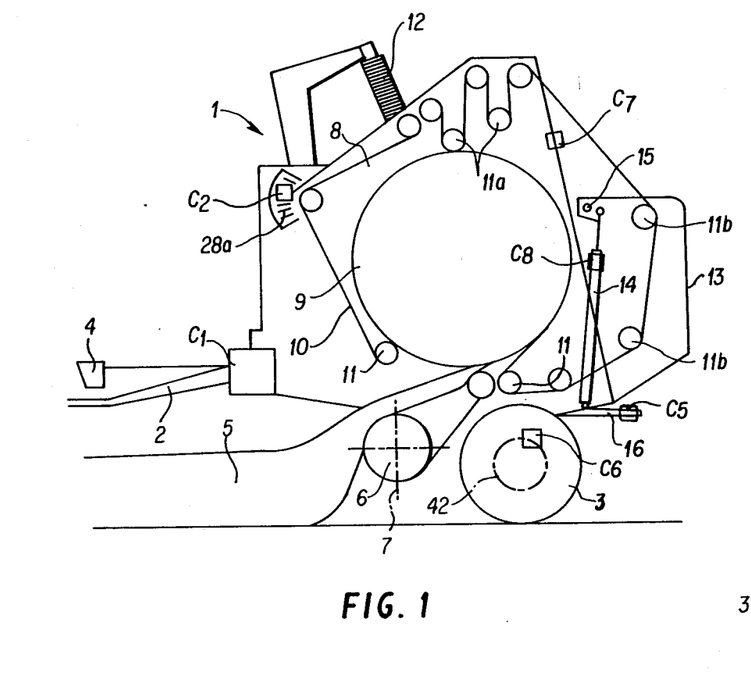
FIG. 1 is a diagrammatic side view in section of a hay baler showing the main elements and the arrangement of the sensors used in the present invention.
Figure 2:
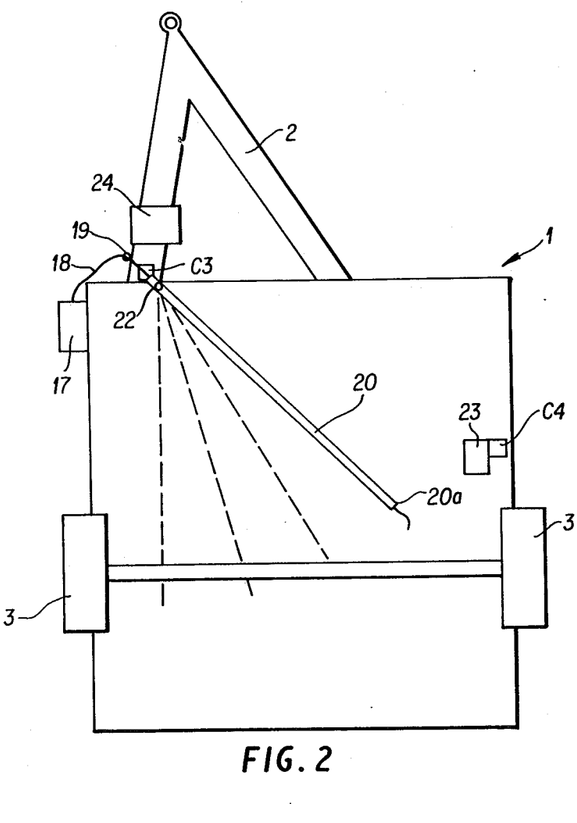
FIG. 2 is a diagrammatic view from below of the baler of FIG. 1 showing the arrangement and the structure of the arm for guiding the tie.

Referring now to the drawings, wherein like reference numerals designated identical or corresponding parts throughout the several views, and more particularly to FIGS. 1 and 2 thereof, wherein the hay baler shown generally as 1 is connected by a hitch 2 to a tractor (not shown in the figures) and supported by two wheels 3. The driving of the various elements of baler 1 is done through a connection with the power take-off 4 of the tractor.

Row 5 which is to form a bale of hay is picked up from the ground by rotary collecting device 6 provided with peripheral points 7. The row is thus brought to the interior of a formation chamber 8 for bale of hay 9. This formation is done in a way known in the art by winding row 5 on itself inside chamber 8. This rotation of the bale being 9 is provided by several belt loops 10 which surround the bale 9 over a large part of its periphery and which are stretched over several rollers 11, some of which, such as 11a, have a mobile shaft which makes possible their movement inside chamber 8 as the diameter of the bale 9 being formed increases. In this way, the length of the loop of belts 10 increases as the diameter of bale 9 increases. After the bale is removed, in the length of the belts is absorbed by the return movement of rollers 11a. The density of bale 9 is determined by the action of compression springs 12.

At the back of baler 1 is a door 13 which can be opened by the action of one or more hydraulic jacks 14. The door 13 swivels around shaft 15 which makes possible the ejection of the bale 9. This is facilitated by the fact that some rollers 11b over which belts 10 pass are mounted inside door 13. During the unloading of bale 9, this door rolls onto unloading ramps 16 which facilitate its drop to the ground.

The tying of bales 9 is done by means of twine coming from a holder 17. Twine 18 passes through a guiding eye 19, then inside of a tubular guiding arm 20 mounted under the frame of the machine. Guiding arm 20 can be driven in a rotating movement around a shaft 22 so that its end 20a undergoes a back and forth movement over the entire width of the baler. A cutting device 23 is placed on one of the ends of the baler opposite shaft 22, near the end of arm 20. The movement of guiding arm 20 is connected by a motor or electric jack 24.

Figure 3:
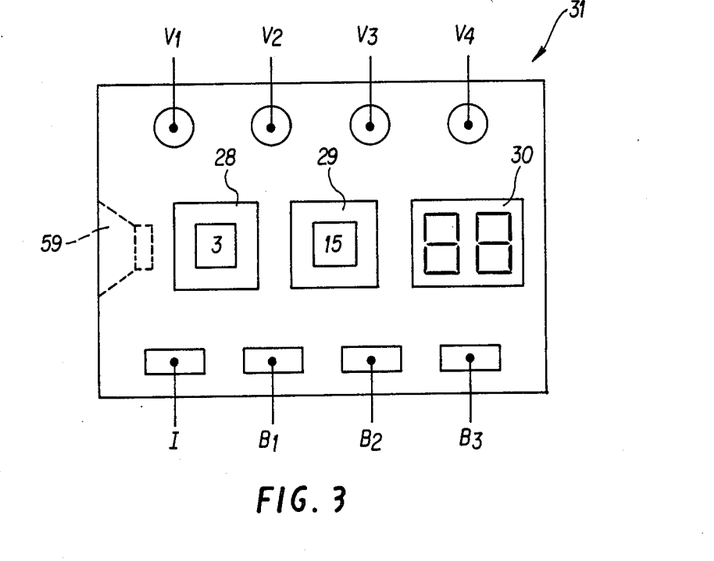
FIG. 3 is an illustration showing the arrangement of the control console from which the operator can act on the present invention.
Figure 4:
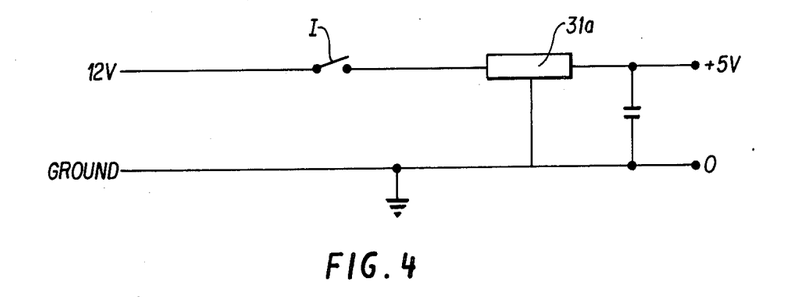
FIG. 4 is a schematic electronic diagram of the electric current supply of the present invention.
Figure 5:
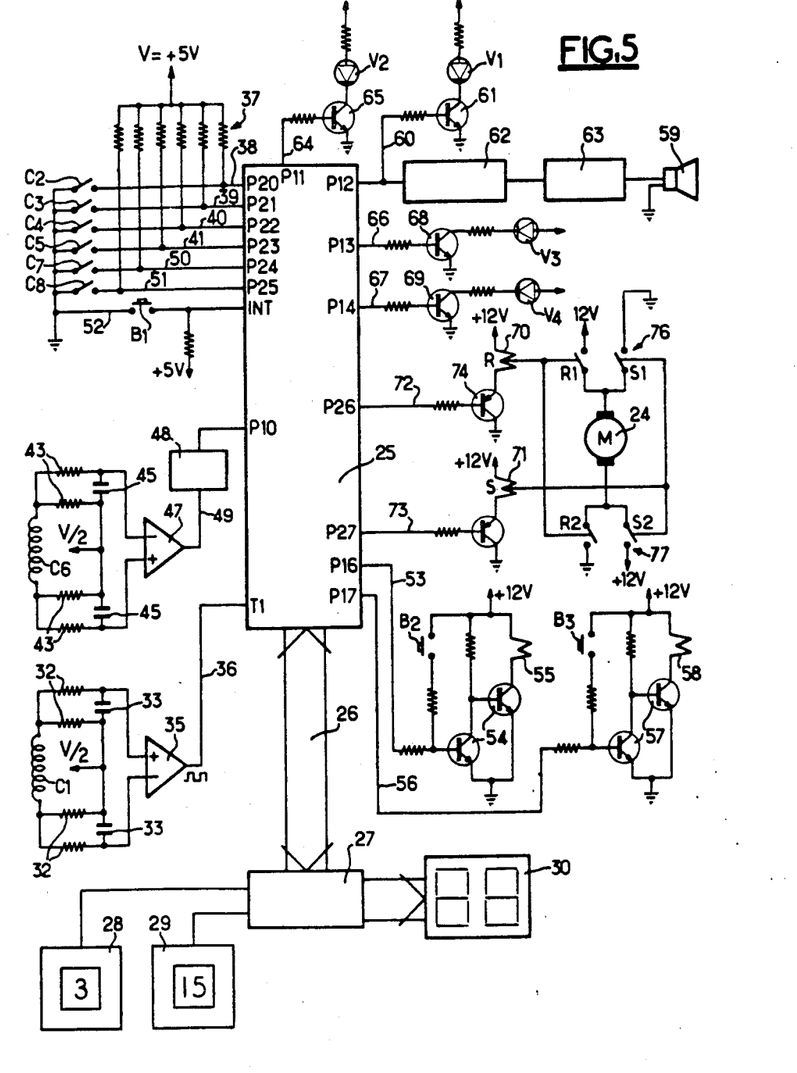
FIG. 5 is a schematic of a first embodiment of an electronic circuit of the present invention.

Now, with further reference to FIGS. 3 to 5, it is seen that the automatic tying control device according to the invention comprises a microprocessor 25 provided with a certain number of input/output connections and connected by a multipath bus connector 26 that makes possible both reading and writing by a three-state bidirectional buffer storage 27, on the one hand with two coding devices 28 and 29 and, on the other hand, with a two-digit display device 30. The two coding devices 28 and 29 which can be, for example, two coding wheels and display device 30 are located on the control console 31 illustrated in FIG. 3. Coding device 28 allows the operator to establish the desired diameter of the bale while coding device 29 allows the operator to determine the number of turns of twine that he wishes to make to tie each bale. The coding wheel of device 29 can, for example, comprise eight positions corresponding to the following number of turns of twine: 6-9-12-15-18-21-25-30. The coding wheel of device 28 can, for example, comprise nine numbers from 1 to 8. Display device 30 allows the operator to know the number of bales completed.

The supplying of current to the electronic circuit is done by on-off switch I which is seen in FIG. 4 and which is located on console 31. Step-down transformer circuit 31a supplies electrical power with a voltage of 5 V from the 12 V power coming from the battery of the tractor. This is used for driving the mechanical elements of the device (motor 24 and control of jack 14).

The control device comprises eight sensors labeled $C_1$ to $C_8$ whose output signals are all introduced into microprocessor 25.

First sensor $C_1$ determines the speed of the device for driving the bale being formed. This sensor is advantageously an inductive sensor placed opposite a toothed wheel connected to power take-off 4 and supplying a certain number of pulses at each turn of this toothed wheel. Sensor $C_1$ therefore makes it possible to determine the linear displacement speed of belts 10 surrounding bale being formed 9.

As can be seen in FIG. 5, the winding of sensor $C_1$ is connected by assembly of resistors 32 and assembly of capacitors 33 at the two inputs of an amplifier 35, the unit constituting an integrating device further providing a suitable filtering. At the output of amplifier 35 connected by connection 36 to clock input $T_1$ of microprocessor 25 appear regular square pulses whose counting makes it possible to deduce the number of turns that the bale makes during the tying operation.

Second sensor $C_2$ makes it possible to detect a predetermined diameter of the bale being formed 9. This sensor can consist of a rod contactor shown in FIG. 5 in the form of a switch connected to resistor 37 and connected by connection 38 to one of the inputs of microprocessor 25.

Third sensor $C_3$ is connected to one of the ends of guiding arm in the vicinity of guiding eye 19 and makes it possible to detect the tension of the twine at the beginning of the tying operation. This sensor is also similar to a switch such as shown in FIG. 5 and connected by connection 39 to microprocessor 25.

The fourth sensor $C_4$ is associated with cutting device 23 and comprises, for example, a roller contactor similar to a switch connected by connection 40 to microprocessor 25.

Fifth sensor $C_5$ is a rod contactor associated with unloading ramps 16 to supply a signal corresponding to the ejection of a bale. It is connected to microprocessor 25 by connection 41.

Sixth sensor $C_6$ is a sensor of the inductive type that supplies pulses at each passage of a ring gear 42 connected to one of wheels 3 of baler 1. Sensor $C_6$ therefore supplies a certain number of pulses at each turn of wheel 3. The winding of sensor $C_6$ is connected like that of sensor $C_1$ by an assembly of resistors 43 and capacitors 45 at the two inputs of an amplifier 47 whose output is connected to a monostable multivibrator 48 itself connected by connection 49 to one of the inputs of microprocessor 25. The information coming from sensor $C_6$ turns on monostable multivibrator 48 so that if baler 1 is in motion, i.e., if wheel 3 is turning, a high signal is sent by the monostable multivibrator 48 on output 49 so as to block the operation of microprocessor 25. This result is obtained by selecting a time constant for monostable multivibrator 48 suitably greater than the time interval separating two pulses coming from sensor $C_6$ and transmitted by amplifier 47. Under these conditions, as soon as baler 1 is stopped, monostable multivibrator 48 falls back to its low level and microprocessor 25 can continue to run the program in progress.

Seventh and eighth sensors $C_7$ and $C_8$ are associated with door 13 of door 1 to control its position. Sensor $C_7$ is a roller contactor which supplies a signal when door 13 is open.

Sensor $C_8$ is preferably a proximity contact with magnetic control by reed switch (ILS) of the normally closed type, fastened on the rod of hydraulic jack 14 that operates door 13. Sensors $C_7$ and $C_8$ shown in the form of switches in FIG. 5 are connected to two inputs of microprocessor 25 by connections 50 and 51.

The operator also has, on control console 31, three manual operation buttons $B_1$, $B_2$ and $B_3$ that are also found in the electronic diagram of FIG. 5.

An action on button $B_1$ connected by connection 52 to one of the inputs of microprocessor 25 makes it possible to perform a tying operation at any time, insofar as baler 1 is stopped.

Push button $B_2$ causes the opening of door 13. For this purpose, the corresponding switch that can be seen in FIG. 5 is connected to one of the outputs of microprocessor 25 by connection 53 and connected by an amplifier circuit of two transistors 54 to winding 55 of an electrically actuated hydraulic valve capable of operating jack 14.

Push button $B_3$ makes it possible to closer door 13. As can be seen in FIG. 5, it is connected by connection 56 to one of the outputs of microprocessor 25 and mounted in the same way as push button $B_2$ by two transistors 57 that amplify the signal and that control winding 58 of said electrically actuated hydraulic valve so as to cause a reverse movement of jack 14.

Control console 31 further comprises four indicators $V_1$ to $V_4$ which make it possible to control certain stages of the functional operations and a sound alarm 59, these elements also being in the diagram of FIG. 5.

Indicator $V_1$ is connected by connection 60 to one of the outputs of microprocessor 25 by an amplifying transistor 61. Sound alarm 59 is connected to the same output of microprocessor 25 by an oscillator 62 and an amplifier 63.

The circuit is such that an intermittent signal, both on visual indicator $V_1$ and audible alarm 59, is emitted when the desired diameter of the bale being formed 9 is reached which is detected by sensor $C_2$. On the other hand, a continuous signal, both on visual indicator $V_1$ and audible alarm 59, is emitted when the tying operation is over, which is detected by sensor $C_4$ after cutting of binder twine 18.

Indicator $V_2$ is connected by connection 64 to one of the outputs of microprocessor 25 by an amplifying transistor 65 so as to emit a light signal when the device detects a failure in the tension of twine 18 before the beginning of a tying operation such as detected by sensor $C_3$.

Indicators $V_3$ and $V_4$ are each connected to an output 66, 67 of microprocessor 25 by amplifying transistors 68, 69. Indicator $V_3$ is lit when door 13 is not closed whereas indicator $V_4$ is lit during the entire duration of operation of tying and ejecting the bale.

Motor 24 that makes possible the drive of guiding arm 20 can be driven in one direction or in the other by two relays 70, 71 connected respectively by connections 72 and 73 to two outputs of microprocessor 25 by two amplifying transistors 74, 75. Each relay 70, 71 controls a double switch 76, 77 each of which causing the rotation of motor 24 in one direction when it is closed. It is thus possible to cause the rotation of motor 24 in both directions and its stopping when switches 76, 77 are open as is represented in FIG. 5.

The control device of the invention as it is illustrated in FIG. 1 to 5 operates in the following manner.

Before beginning the hay collecting operation, the operator mechanically regulates on the baler the diameter of bales 9 that he wishes to make by moving a cursor on a graduated sector 28a that can be seen in FIG. 1. He then establishes on his control console 31 the number of turns of twine that he wishes to make to tie each bale 9 by acting on the coding wheel of the coding device 29. On the second coding wheel 28, the operator refers to the indication of the graduated sector corresponding to the desired diameter of the bales. The work can then commence. Baler 1 driver by its tractor and connected by power take-off 4 makes a bale of hay 9 by the standard process of winding the row inside bale-formation chamber 8.

Figure 7A:
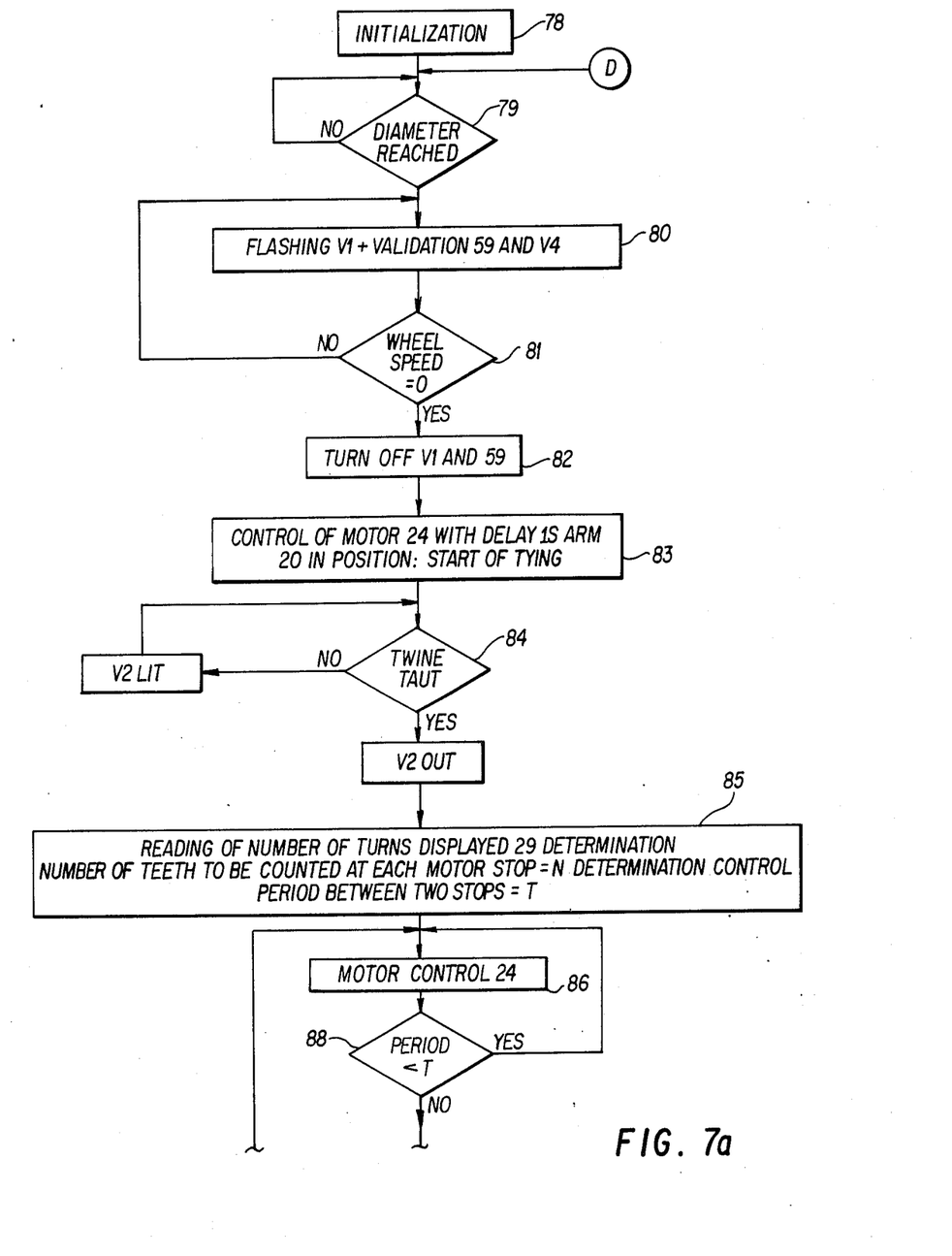
FIGS. 7a and 7b are flowcharts of a succession of stages during the operation of the present invention.
Figure 7B:
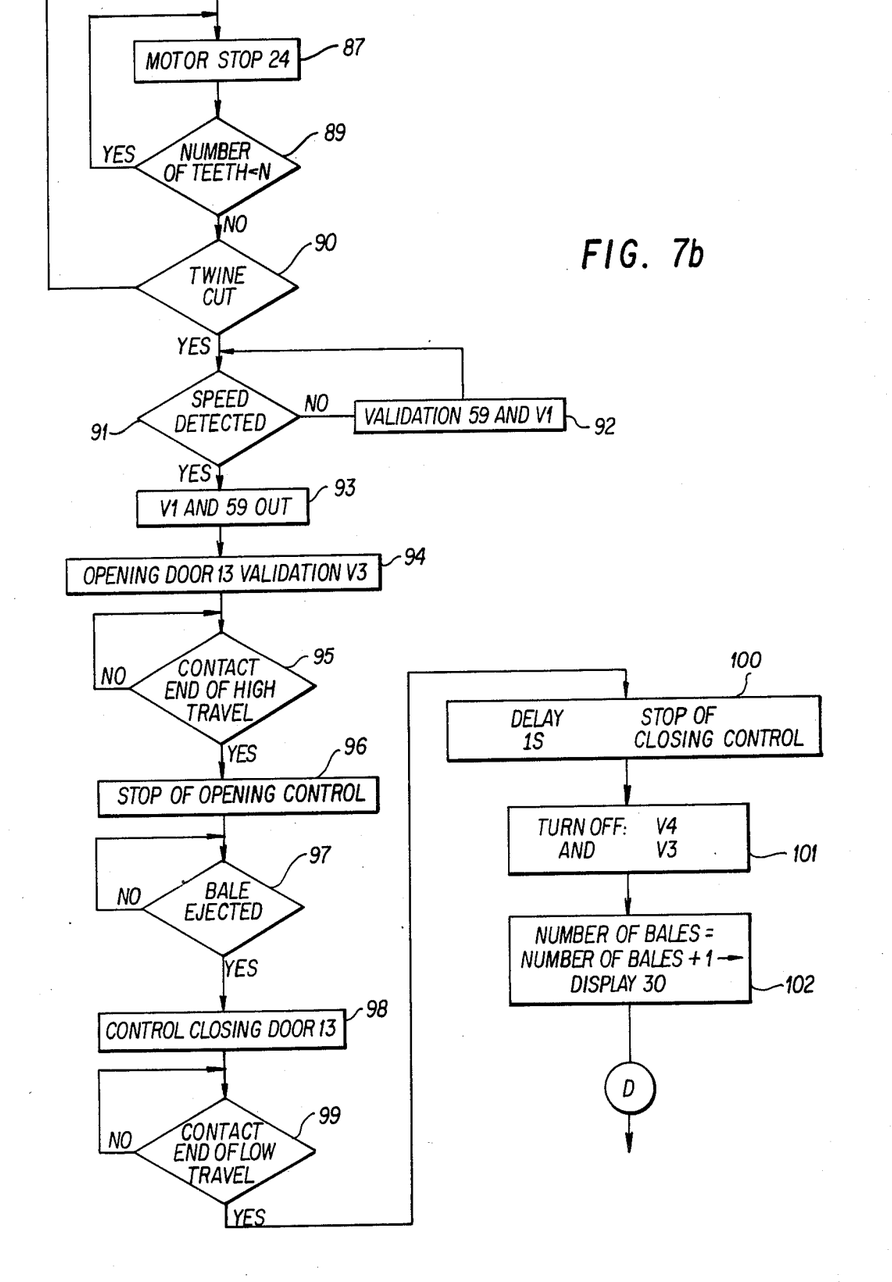

The automation of the typing and ejection by the device of the invention is then done by following the various stages of the flowchart illustrated in FIGS. 7a and 7b.

The operator is notified of the diameter reached by the bale being formed 9, as detected by sensor $C_2$, by the intermittent sound signal of alarm 59 and blinking indicator $V_1$. After initialization of microprocessor 25 and its input/output connections by operation 78, it is asked at 79 if the diameter of the bale has been reached and if yes, indicator $V_1$ and alarm 59 are started intermittently while indicator $V_4$ indicates to the operator that an operating sequence can begin (instruction 80). The system then asks at 81 if the baler is in stopped position according to the indications of sensor $C_6$. The stopping of the tractor and of the baler causes, by instruction 82, the interruption of the sound signal on alarm 59 and the turning off of indicator $V_1$. The tying operation itself can begin by instruction 83. The system first asks at 84 if the tension of the twine, as is detected by sensor $C_3$, is suitable, causing in the opposite case a luminous alarm signal by indicator $V_2$.

Microprocessor 25, knowing the required number of turns of white, displayed by the coding device 29 and the diameter of the bale to be tied, displayed by coding device 28, can cause a discontinuous drive of electric motor 24 so that guiding arm 20 is moved in a back and forth movement from one of the lateral sides of the baler to the other side, then returns to its initial position, these two movements being interrupted by several stops diagrammatically represented in FIG. 2 in broken lines Microprocessor 25 is programmed to compute the number of stops that it is necessary to impose in the movement of guiding arm 20 both to go from one end to the other of the bale and to return and the period of each of these stops. Actually, during each stop the bale continues to be driven in rotation and the microprocessor can therefore compute the number of turns of twine made at each stop as a function of its period. Under these conditions, the microprocessor knowing the required number of turns of twine and the diameter of the bale to be tied determines the number of stops and their period to obtain the desired number of turns of twine.

This operation is diagrammed by instruction 85 of FIG. 7a which determines the period of each stop by the number of teeth N that sensor $C_1$ must count at each stop of motor 24 and the period having to lapse between each stop T. The motor is controlled by instructions 86, 87, the queries on time T and number N being done at 88 and 89. At the end of the operation, the system asks at 90 if the twine is cut which occurs as soon as guiding arm 20 arrives at a stop and is detected by sensor $C_4$. The information coming from sensor $C_4$ connected to cutting device 23 makes it possible for microprocessor 25 to go on to the operation for ejecting the bales.

However, this operation can take place only if the rotation of the bale is stopped. This is queried at 91, an alarm being sent by instruction 92 if the operator has not cut off the power take-off 4. As soon as the speed detected by sensor $C_1$ is zero, the alarm is stopped at 93 and the microprocessor automatically controls the opening of door 13 by instruction 94. When the end of the path contact is detected by sensor $C_7$ and queried at 95, the movement of the door is stopped by instruction 96. The system controls at 97 by sensor $C_5$ the ejection of the bale and then causes at 98 the closing of the door 13 detected by sensor $C_8$ at 99. The two sides of door 13 not being locked simultaneously, it is preferable to provide a delay by instruction 100, of about 1 second before cutting the control of the electrodistributor of jack 14. The turning off of indicators $V_3$ and $V_4$ by instruction 101 makes it possible for the operator to verify the correct closing of door 13. Finally, the number of bales made is incremented by operation 102 and displayed on display device 30.

A priority action on button $B_1$ causes an interruption on microprocessor 25 which then begins a tying sequence after query at 79 of the diameter reached.

Figure 6:
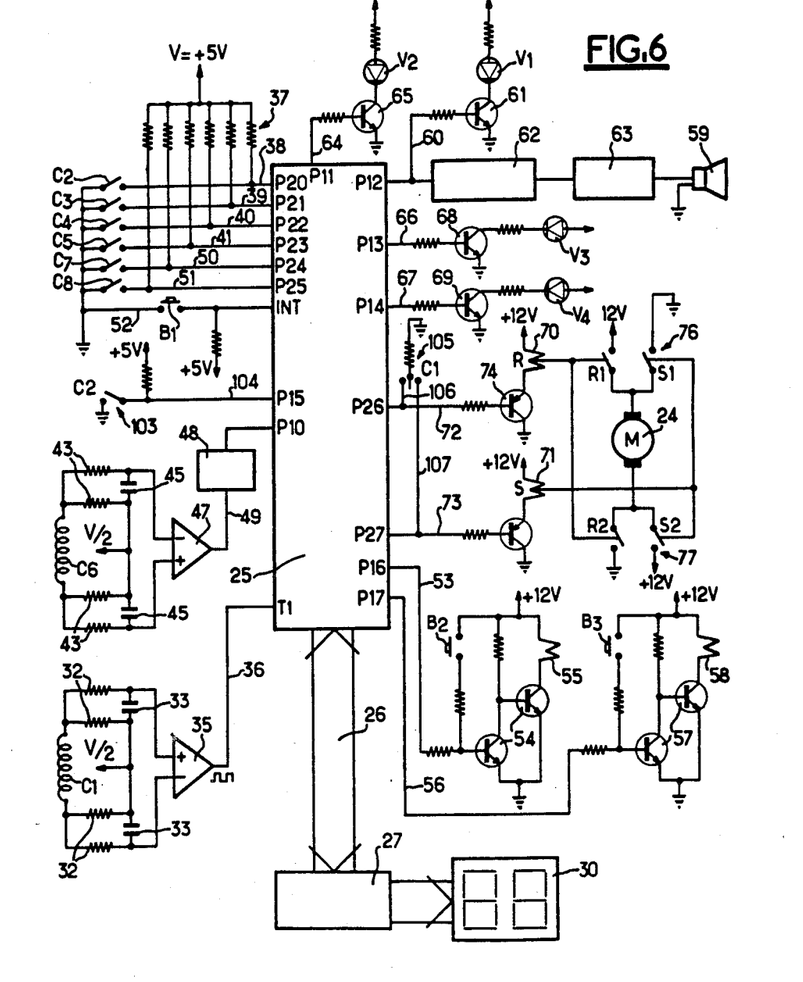
FIG. 6 is a schematic of a second embodiment of an electronic circuit of the present invention.

In a second embodiment shown in FIG. 6, the role of the microprocessor 25 is slightly different. In this embodiment, the two coding wheels 28 and 29 are eliminated. A switch 103 is connected by connection 104 to one of the inputs of microprocessors 25. A rocker switch 105 is mounted by connections 106 and 107 between connections 72 and 73 which connect microprocessor 25 to two relays 70 and 71 to allow manual control of the rotation of motor 24 in either direction. The two switches 103 and 105 are installed in the control console of the operator.

The system thus modified then functions as follows. In a first phase, switch 103 is placed in open position. When the conditions are met for start of the tying and for the first bale formed, microprocessor 25 then considers connections 72 and 73 as inputs. Microprocessor 25 stores the times corresponding to the period of each state (motor 24 stopped, displacement to the left of guiding arm 20, displacement to the right of guiding arm 20). During this preliminary mode of learning phase, the operator therefore controls guiding arm 20 by acting in one direction or the other on switch 105, thus causing a certain number of stops and at each stop a certain number of turns of twine during back and forth movement of the arm.

For the operation of tying subsequent bales, the operator closes switch 103 which corresponds to the second mode or automatic phase and no longer acts on switch 105. In this position, connections 72 and 73 are considered by the microprocessor as outputs. Microprocessor 25 is then able, by following a succession of instructions similar to those shown in FIG. 7a and 7b to repeat the tying sequence stored during the preliminary learning mode.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automatic control device for tying a hay bale in a hay baler comprising:
   a tie guiding arm having a first end which is driven back and forth over the width of said baler;
   an electric motor connected to said arm for driving said first end;
   means to drive bales in rotation;
   a first sensor for sensing the speed of said means to drive;
   a microprocessor for receiving input signals from ssaid first sensor and for producing signals for controlling said electric motor so that said first end is stopped and held in position a determined number of times and for a determined period.

2. Automatic control device according to claim 1, further comprising a second sensor to detect the diameter of the bale being formed.

3. An automatic control device for tying a hay bale in a hay baler comprising:
   a tie guiding arm having a first end which is driven back and forth over the width of said baler;
   an electric motor connection to said arm for driving said first end;

means to drive bales in rotation;

a microprocessor;

switch means connected to said electric motor for controlling said electric motor;

manual actuating means connected to said switch means for manually controlling said electric motor;

automatic actuating means connected to said switch means for controlling said electric motor by said microprocessor;

selecting switch means for selectively connecting one of said manual and automatic actuating means;

said microprocessor having a first mode of operation for storing information regarding the movements and periods of rest of said motor while said selecting switch means connects said manual actuating means and said motor is controlled by a human operator and a second mode of operation for controlling said motor according to the stored information while said selecting switch means connects said automatic actuating means; and a first sensor for detecting the speed of the means for driving the bale in rotation and a second sensor for detecting the diameter of the bale being formed, said first sensor and said second sensor being connected to said microprocessor, said microprocessor controlling said electric motor in response thereto.

4. Automatic control device according to claims 2 or 3 further comprising a third sensor to detect the tension of the tie at the beginning of the typing operation.

5. Automatic control device according to claim 4, further comprising:

a door that can be opened and closed by a double-action jack and locked in a closed position, the opening of said door causing ejection of a tied bale;

a fourth sensor working with a tie cutting device at the end of the tying operation and connected to said microprocessor, said microprocessor causing the ejection of the bale by opening said door when the signals sent by said first sensor corresponds to the stopping of a rotation of the bale, then causing the closing of the door.

6. Automatic control device as in claim 5, further comprising:

a ramp for discharging the ejected bales;

a fifth sensor associated with said discharge ramp for detecting the ejection of a bale and connected to the microprocessor.

7. Automatic control device according to claim 6, further comprising a sixth sensor for detecting the speed of displacement of the baler and connected to the microprocessor to allow the operations of tying and ejecting only during stopping.

8. Automatic control device according to claim 3, further comprising:

a bidirectional buffer storage connected to said microprocessor by way of a multipath bus connector; and a display connected to said buffer storage.

9. An automatic control device for tying a hay bale in a hay baler comprising:

a tie guiding arm having a first end which is driven back and forth over the width of said baler;

an electric motor connection to said arm for driving said first end;

means to drive bales in rotation;

a microprocessor;

switch means connected to said electric motor for controlling said electric motor;

manual actuating means connected to said switch means for manually controlling said electric motor;

automatic actuating means connected to said switch means for controlling said electric motor by said microprocessor;

selecting switch means for selectively connecting one of said manual and automatic actuating means;

said microprocessor having a first mode of operation for storing information regarding the movements and periods of rest of said motor while said selecting switch means connects said manual actuating means and said motor is controlled by a human operator and a second mode of operation for controlling said motor according to the stored information while said selecting switch means connects said automatic actuating means;

a bidirectional buffer storage connected to said microprocessor by way of a multipath bus connector; and a display connected to said buffer storage.

* * * * *